Dec. 13, 1955 M. M. LEVY 2,727,093

MULTI-CHANNEL COMMUNICATION SYSTEMS

Filed Jan. 22, 1951 2 Sheets-Sheet 1

INVENTOR

MAURICE MOISE LEVY

BY [signature]

ATTORNEY

Filed Jan. 22, 1951 2 Sheets-Sheet 2

INVENTOR
Maurice Moise Levy
BY
[signature]
ATTORNEY

United States Patent Office 2,727,093

Patented Dec. 13, 1955

2,727,093

MULTI-CHANNEL COMMUNICATION SYSTEMS

Maurice Moise Levy, London, England, assignor to The General Electric Company Limited, London, England Application January 22, 1951, Serial No. 207,088

Claims priority, application Great Britain January 25, 1950

5 Claims. (Cl. 179—15)

Figure 1:
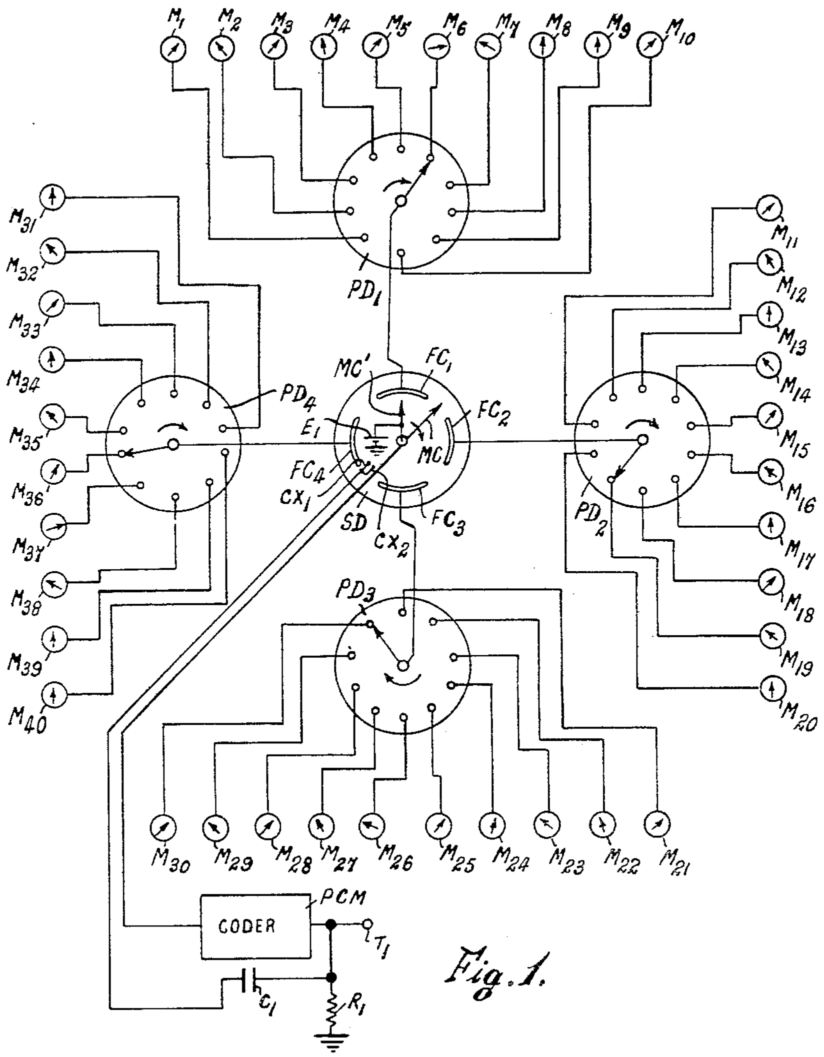

The present invention relates to multi-channel communication systems.

In known multi-channel communication systems it is common practice to provide *n* channels to transmit intelligence originating from *n* sources respectively.

It is usually the case, however, that a number of channels less than *n* would be capable of transmitting the intelligence supplied by the *n* sources provided suitable means could be devised to enable this to be effected. The present invention is concerned with the provision of such means.

In known systems unnecessary transmissions are sometimes made. This occurs for example during periods when there is no intelligence to be transmitted, the source being inactive. It is usually arranged to transmit signals during such periods informing a receiver that the source is inactive. Furthermore when a waveform is being transmitted there may be periods during which no change in the amplitude of the waveform takes place. In such circumstances it is necessary merely to send a signal which indicates that the amplitude has been reached and to send no further signals until the amplitude changes, instead of sending a succession of signals indicating that the amplitude is remaining constant. Then again a sufficiently good approximation of a waveform can often be transmitted by transmitting a sequence of signals representing a sequence of changes, each exceeding a predetermined amount, in the amplitude of the waveform.

It will be seen therefore that items of intelligence to be transmitted usually originate at random instants. Hereinafter an item of intelligence to be transmitted will be referred to as a message. A message consists of say a meter reading falling within a predetermined range, a change of any magnitude in the amplitude of a wave, or a change in amplitude exceeding a predetermined amount.

It has previously been proposed to provide a multi-channel communication system in which each source of intelligence is tested periodically and in sequence and a signal is transmitted only when a change exceeding a predetermined amount has occurred. In this arrangement time is lost testing sources which have no intelligence to transmit. Furthermore, if one of the sources originates messages at a mean rate much higher than that of the other sources, the rate of testing must be made sufficiently high to deal with that one source irrespective of the fact that the rate of testing becomes unnecessarily high with regard to the other sources.

An object of the present invention is to provide apparatus for use in a multi-channel communication system, whereby the system can be made more efficient than the aforesaid previously proposed system.

According to the present invention in a multi-channel communication system for transmitting messages originating at random instants at a plurality of sources, the sources are grouped in such a manner that the mean rates at which messages originate in the several groups are approximately equal, the several groups are connected to a plurality of primary selector-switching devices respectively, each primary selector-switching device being adapted to select from the group associated therewith at any one instant only one source with a message to be sent, the output terminals of the primary selector-switching devices are connected to the input terminals respectively of a secondary selector-switching device adapted to select at any one instant the output from only one of the primary selector-switching devices, and means are provided whereby when a source with a message to be sent is connected through its primary selector-switching device and the secondary selector-switching device to an output terminal, the message is sent together with a signal identifying the source.

Figures 2, 3, 4, 5:
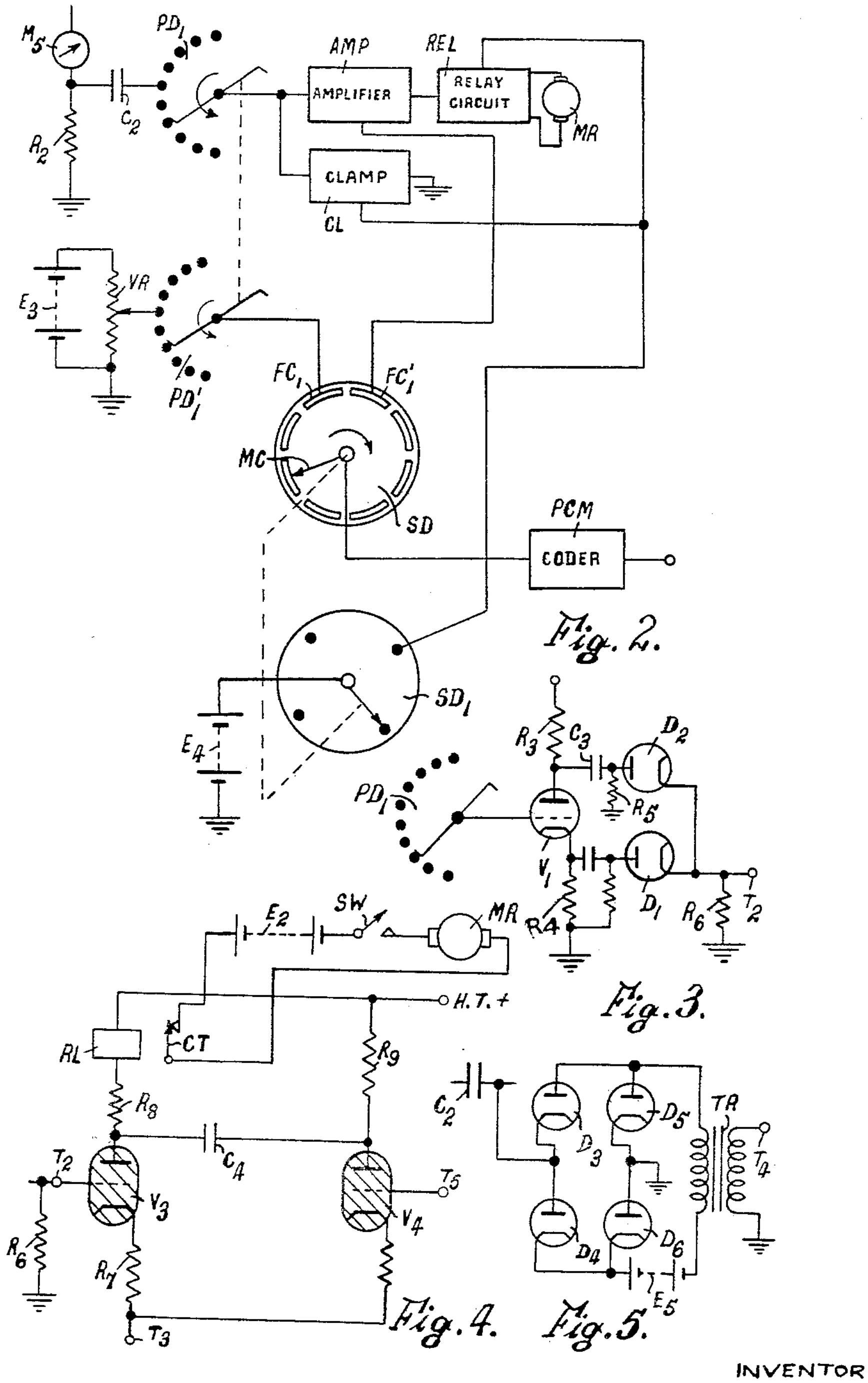

The invention will now be described, by way of example, with reference to the accompanying drawings, in which Figure 1 is a schematic diagram of one embodiment of the invention, Figure 2 is a diagram of a circuit suitable for use in the embodiment shown in Figure 1, Figure 3 is a circuit diagram of an amplifier suitable for use in the arrangement of Figure 2, Figure 4 is a circuit diagram of a relay circuit suitable for use in the arrangement of Figure 2, and Figure 5 is a circuit diagram of a clamp circuit suitable for use in the arrangement of Figure 2.

Referring to Figure 1, this is a schematic diagram of a multi-channel communication system for use in transmitting changes in meter readings to a distance. Forty meters $M_1$ to $M_{40}$ are shown and are assumed to be ammeters or voltmeters. The meters are arranged in four groups of ten meters each, the meters being grouped in such a manner that the mean repetition frequencies of the messages (changes in meter readings) originating in the several groups are about equal. This frequency will be referred to as $f$ c./s.

For each group of ten meters a primary selector switch is provided, the four primary selector switches being shown at $PD_1$, $PD_2$, $PD_3$, and $PD_4$ respectively. Each primary selector switch is shown to have ten fixed contacts and a moving contact, suitable connections being provided to connect the ten meters in each group to the ten fixed contacts respectively of the primary selector switch associated with the group.

The moving contacts of the four primary selector switches are connected to four fixed contacts $FC_1$ to $FC_4$ respectively of a secondary selector switch SD. The moving contact MC of the switch SD is arranged to rotate continuously at $f$ revolutions per second whereby this contact is connected to the primary selector switches in turn $f$ times per second, that is to say at the same rate as that at which messages originate for transmission in each of the four groups. Any suitable motor (not shown) may be used to rotate the moving contact MC.

The moving contact MC is connected to a pulse code modulator PCM and thence to an output terminal $T_1$.

It is arranged, as will be described later, that the moving contacts of each of the four primary selector switches $PD_1$ to $PD_4$ hunts over its associated fixed contacts until a contact is reached connected to a meter with a message to be transmitted. The moving contact of the primary selector switch is then arrested on that fixed contact until the message is transmitted by way of the secondary selector switch SD and the modulator PCM.

For the purpose of identifying the origins of the transmitted messages when received at a receiving station the meters of each group are allotted identifying codes, for example, the numbers 0 to 9 respectively. Each meter may then be identified by a signal representing the group number followed by the number of the meter in the group. The need for transmitting a code with each message to identify the group number can, however, be overcome by providing at the receiver a suitable distributor, which may be identical with the secondary selector switch SD, and maintaining the distributor in synchronism with the secondary selector switch SD at the transmitter. This may be achieved in any known or suitable manner. For example, the secondary selector switch may be provided with two auxiliary contacts $CX_1$ and $CX_2$ arranged close to one another as shown. A battery $E_1$ is connected to an auxiliary moving contact MC′ of the secondary selector switch SD whereby when the moving contact MC′ passes over the auxiliary contacts two closely-spaced pulses appear at the auxiliary contacts respectively. These two pulses are applied by way of a capacitor $C_1$ and resistor R to the output terminal $T_1$. These pulses may then be used in known manner at the receiver in synchronising the distributor to the secondary selector switch SD at the transmitter.

It is therefore necessary merely to transmit a code before each message for the purpose of identifying the number of the meter in the group.

It will be appreciated that the secondary selector switch is substantially fully loaded, that is to say during almost every revolution of the moving contact MC, four messages are transmitted, and furthermore, the speed of revolution ($f$ revolutions per second) of the moving contact MC is much less than in the aforesaid proposed system. Design difficulties are therefore reduced, and no time is wasted by the secondary selector switch in testing the several meters. This is done by the primary selector switches.

Referring to Figure 2, this is a circuit diagram of an arrangement suitable for use in the embodiment shown in Figure 1, and by means of which the moving contact of a primary selector switch can be arrested on a fixed contact connected to a meter with a message to be transmitted, a signal identifying the number of the meter in the group followed by the message can be sent, and the moving contact released thereby permitting the primary seelctor switch to hunt again.

In Figure 2 the meter $M_5$ is shown and is assumed to be an ammeter or voltmeter. A resistor $R_2$ is shown connected in series with the meter $M_5$ and hence a voltage proportional to the meter reading is developed across the resistor $R_2$. Whenever this voltage changes by more than a predetermined amount, it is required to transmit a message representative of the change.

It will be seen that the junction between the meter $M_5$ and resistor $R_2$ is connected through a capacitor $C_2$ to the fifth fixed contact of the primary selector switch $PD_1$. The moving contact of this switch is connected to an amplifier AMP arranged in such a manner as to provide a positive output voltage irrespective of whether a change in input voltage thereto is positive or negative. The amplifier may be, for example, as shown in Figure 3, in which the moving contact of the switch $PD_1$ is connected to the control grid of a triode valve $V_1$ which has an anode load resistor $R_3$ and a cathode load resistor $R_4$. The cathode of the valve $V_1$ is connected to the anode of a diode valve $D_1$ whose cathode is connected to an output terminal $T_2$. The anode of the triode valve $V_1$ is connected through a capacitor $C_3$ to the anode of a diode valve $D_2$ whose cathode is connected to the output terminal $T_2$. A leak resistor $R_5$ is provided for the capacitor $C_3$ and a resistor $R_6$ is connected between the output terminal $T_2$ and earth.

If a negative voltage is applied to the control grid of the valve $V_1$ the anode thereof becomes more positive and this positive-going voltage is transmitted by way of the capacitor $C_3$ and the diode $D_2$ to the output terminal $T_2$. If on the other hand a positive voltage is applied to the control grid of the valve $V_1$ the cathode of the valve $V_1$ becomes more positive and this positive-going voltage is transmitted to the output terminal $T_2$ by way of the diode $D_1$.

Referring again to Figure 2 the output of the amplifier AMP is applied to a relay circuit REL which is arranged to become operative and to stop a motor MR whenever the voltage applied to the circuit REL from the amplifier AMP exceeds a predetermined value. The motor MR is used to drive the moving contact of the switch $PD_1$.

The relay circuit may, for example, be as shown in Figure 4 in which the terminal $T_2$ of Figure 3 is connected to the control grid of a gas-filled triode valve $V_3$. The cathode of the triode $V_3$ is connected through a resistor $R_7$ to a terminal $T_3$ which is held at a predetermined negative voltage relatively to earth, and the anode of the triode $V_3$ is connected through a resistor $R_8$ and a relay winding RL to the positive terminal HT+ of a source (not shown) of high tension whose negative terminal is earthed.

In order to strike the valve $V_3$ the voltage between the control grid and cathode thereof must be raised to a suitable value. The potential of the cathode is already negative as previously explained, and hence the voltage necessary between the terminal $T_2$ and earth to strike the tube is not the full striking voltage but only a part thereof. For example if the striking voltage is 70 volts the cathode may be negatively biased at $-60$ volts whereby a voltage of only 10 volts is necessary between the terminal $T_2$ and earth to strike the valve.

When the valve $V_3$ is struck the relay winding RL is energised by the anode current of the valve $V_3$. The relay RL has contacts CT associated therewith and arranged normally to be closed. These contacts are in series with the motor MR, a master switch SW and a voltage supply $E_2$. Thus, assuming the master switch to be closed, the motor MR continues to drive the moving contact of the switch $PD_1$ (Figure 1) until the valve $V_3$ is struck. The contacts CT then open and break the supply to the motor which then stops. A second gas-filled triode valve $V_4$ is provided for extinguishing the valve $V_3$ as will be described later.

Referring again to Figure 2, if the voltage across the resistor $R_2$ is of an amplitude such that when connected by way of the switch $PD_1$ and the amplifier AMP to the circuit REL causes the triode valve $V_3$ (Figure 4) to be struck, the motor MR stops and the moving contact of the switch $PD_1$ remains connected to the capacitor $C_2$.

The selector switch $PD_1$ has a second bank $PD_1'$ of ten contacts with a separate moving contact, the moving contact of the second bank being ganged to that of the first bank. Voltages of different magnitudes and identified with the several meters in the group are applied to the ten fixed contacts respectively of the second bank $PD_1'$. These voltages may, for example, be supplied by means of a source $E_3$ of direct voltage, and potentiometers of which one is shown at VR.

Each fixed contact of the secondary selector switch SD may be in two parts, for example, as shown at $FC_1$ and $FC_1'$, and arranged in such a manner that the moving contact passes firstly over one then the other and takes the same time to pass over each.

In Figure 2 the part $FC_1$ is shown connected to the moving contact of the bank $PD_1'$, and hence when the moving contact MC reaches $FC_1$ the modulator PCM is connected to one of the fixed contacts of the bank $PD_1'$. The voltage level existing at that fixed contact of the switch $PD_1'$ is therefore coded by the modulator and the pulse code is transmitted identifying the meter associated with the corresponding fixed contact of the first bank $PD_1$.

The moving contact MC of the secondary selector switch then moves to the fixed contact $FC_1'$ which is connected to a suitable point in the amplifier AMP say the cathode of the valve $V_1$ of Figure 3. The voltage level existing at the cathode of $V_1$ is therefore then coded by the modulator PCM and the pulse code is transmitted conveying the amplitude level existing at the cathode of the valve $V_1$.

It is then necessary to prevent readings on the same meter from being transmitted until a change in reading has occurred, and to energise the motor MR once more to cause the moving contact of the primary selector switch $PD_1$ to hunt for a further meter with a message ready for transmission. Both of these requirements can readily be met with the aid of a second bank $SD_1$ of fixed contacts on the secondary selector switch SD. The moving contact on the bank $SD_1$ is connected to the positive terminal of a source $E_4$ of direct voltage whose negative terminal is earthed. Thus as the moving contact of the bank $SD_1$ rotates positive-going pulses appear at the four fixed contacts thereof in succession, and it is arranged that these pulses occur just after the moving contact MC has left the second part of each contact on the main bank SD. The four fixed contacts of the bank $SD_1$ are connected to the circuits of the four primary selector switches and it is arranged that one of these positive-going pulses is applied to the circuit of each primary selector switch just after the primary selector switch has been explored by the secondary selector switch.

As shown in Figure 2 a fixed contact of the bank $SD_1$ is connected to a clamp circuit CL and to the relay circuit REL. The clamp circuit may take any suitable form such as that shown in Figure 5 in which a terminal $T_4$ is that to which positive-going pulses from the bank $SD_1$ of Figure 2 are applied. The clamp circuit comprises four diodes $D_3$ to $D_6$ connected as shown. The right-hand plate of the capacitor $C_2$ is connected to the junction of the diodes $D_3$ and $D_4$ and the junction of the diodes $D_5$ and $D_6$ is earthed. The diodes are normally held non-conducting by means of bias supplied by a source $E_5$ whereby the potential of the right-hand plate of the capacitor $C_2$ is allowed to vary. Whenever a positive-going pulse is applied to the terminal $T_4$, however, this is transmitted to the diodes by way of a non-phase-reversing transformer TR and causes the diodes to become conducting. The potential of the right-hand plate of the capacitor is therefore clamped to earth potential. Thereafter the potential of the left-hand plate of the capacitor must be changed in order to alter the potential of the right-hand plate from zero. In this way only changes in meter readings are transmitted.

In order to start the motor MR again, the positive-going pulses applied to the clamp circuit CL are also applied to the relay circuit REL. Referring to Figure 4, the positive-going pulses are applied to a terminal $T_5$ connected to the control grid of the gas-filled triode $V_4$. Each pulse applied to the terminal $T_5$ strikes the valve $V_4$. The potential of the anode of this valve falls owning to the presence of an anode load resistor $R_9$ and this negative-going voltage is applied by way of a capacitor $C_4$ to the anode of the valve $V_3$ and extinguishes this valve. The relay RL is then de-energised and the contacts CT close causing the motor MR to start.

The valve $V_4$ is left in its struck condition but when the valve $V_3$ is next struck, the anode potential of $V_3$ falls and this negative-going voltage is applied by way of the capacitor $C_4$ to the anode of the valve $V_4$ and serves to extinguish this valve.

Although an arrangement has been described in which the numbers of meters in the several groups are equal, it will be understood that this need not be the case. It is merely necessary to arrange that the rates at which messages originate in the several groups are about equal.

If one meter has a greater number of messages to send than the others, this meter may be connected in a small group. Alternatively, or in addition, this meter may be connected into two or more of the groups.

It will be understood that although mechanical selector switches have been described, equivalent electronic switches may alternatively be used. For example, a known cathode ray distributor may be used in the place of the selector switch SD.

I claim:

1. A multi-channel communication system for transmitting messages originating at random instants at a plurality of sources, comprising a plurality of primary selector-switching devices, each said primary selector-switching device having a plurality of input terminals and an output terminal, means connecting said sources in groups to the input terminals of said primary selector-switching devices, different ones of said groups being connected to different ones of said primary selector-switching devices, and different ones of the sources in each said group being connected to different ones of the input terminals of the associated one of the said primary selector-switching devices, means controlling each said primary selector-switching device to select at any one instant from the one of said groups associated therewith only one of said sources at which a message is available for transmission, a secondary selector switch having a plurality of input terminals and an output terminal, means connecting the output terminals of said primary selector-switching devices to the input terminals respectively of said secondary selector-switching device, means responsive to the establishment of a connection from any one of said sources through its associated one of said primary selector-switching devices and said secondary selector-switching device to the output terminal of said secondary selector switching device to transmit a signal identifying the last said source, and means for transmitting the message from the last-said source.

2. A multi-channel communication system as claimed in claim 1, wherein there is provided means connecting one source of said plurality of sources to one input terminal of said plurality of input terminals of each of two primary selector-switching devices of said plurality of primary selector-switching devices, whereby said one source is connected into two of said groups.

3. A multi-channel communication system as claimed in claim 1, wherein there is provided means for generating a plurality of signal voltages each signal voltage of the plurality of signal voltages differing from each other signal voltage of the plurality of signal voltages in voltage amplitude and different ones of said plurality of signal voltages identifying at least different ones of said sources in each of said groups from one another, said signal identifying the last said source being constituted at least in part by the signal voltage which identifies that source from at least different ones of said sources in a group in which that source is connected.

4. A multi-channel communication system as claimed in claim 1, wherein means are provided to cancel each message after transmission to prevent repeated transmission of the same message.

5. A multi-channel communication system as claimed in claim 1, wherein means are provided to drive said secondary selector-switching device at a constant speed, and means are provided for generating synchronising signals to enable a receiving distributor to be synchronised with said secondary selector-switching device.

References Cited in the file of this patent

UNITED STATES PATENTS

| | | |
|---|---|---|
| 1,779,748 | Nicolson | Oct. 28, 1930 |
| 2,454,815 | Levy | Nov. 30, 1948 |
| 2,486,491 | Meacham | Nov. 1, 1949 |
| 2,516,587 | Peterson | July 25, 1950 |
| 2,551,024 | Levy | May 1, 1951 |
| 2,586,825 | Jacobsen | Feb. 26, 1952 |